(12) United States Patent
Maertens et al.

(10) Patent No.: US 9,789,801 B2
(45) Date of Patent: Oct. 17, 2017

(54) UNIBODY HOPPER TRAILER

(71) Applicant: TITAN TRAILERS INC., Delhi (CA)

(72) Inventors: Andrew Joseph Maertens, Delhi (CA); Bryan Morris Bracewell, Woodstock (CA); Michael Kloepfer, Delhi (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 14/915,725

(22) PCT Filed: Aug. 29, 2014

(86) PCT No.: PCT/CA2014/050829
§ 371 (c)(1),
(2) Date: Mar. 1, 2016

(87) PCT Pub. No.: WO2015/031992
PCT Pub. Date: Mar. 12, 2015

(65) Prior Publication Data
US 2016/0193951 A1     Jul. 7, 2016

Related U.S. Application Data

(60) Provisional application No. 61/874,655, filed on Sep. 6, 2013.

(51) Int. Cl.
*B60P 1/56* (2006.01)

(52) U.S. Cl.
CPC ..................... *B60P 1/56* (2013.01)

(58) Field of Classification Search
CPC .... B60P 1/56; B60P 3/221; B60P 3/24; B60P 1/003; B60P 3/2205; B60P 3/224;
(Continued)

(56) References Cited

U.S. PATENT DOCUMENTS

| | | | |
|---|---|---|---|
| 1,813,537 A * | 7/1931 | Gilpin | B61D 9/06 105/249 |
| 3,557,714 A | 1/1971 | Aquino et al. | |

(Continued)

FOREIGN PATENT DOCUMENTS

| | | |
|---|---|---|
| CA | 2163382 A1 | 5/1996 |
| CA | 2228352 A1 | 7/1999 |

(Continued)

OTHER PUBLICATIONS

International Preliminary Report on Patentability for Application No. PCT/CA2014/050829, dated Dec. 16, 2015, 9 pages.

(Continued)

*Primary Examiner* — Glenn Dayoan
*Assistant Examiner* — Sunsurraye Westbrook
(74) *Attorney, Agent, or Firm* — Jason Mueller-Neuhaus; Borden Ladner Gervais LLP

(57) ABSTRACT

A hopper trailer has a chassis with longitudinal rails mounted to a wheeled suspension. Triangular load transfer plates are mounted vertically on and carried by the longitudinal rails. A container has opposing sidewalls, opposing end walls, and two sloping walls each spanning between and adjoining the opposing sidewalls. The sloping walls and the sidewalls form a hopper. One of the sloping walls is mounted on and carried by the load transfer plates. The sidewalls are mounted to and carried by the sloping wall. The weight of a bulk material carried in the hopper and the weight of the sidewalls is carried by the sloping wall. This weight is transferred vertically downwardly from the sidewall through the load transfer plate into the chassis without substantial deflection from a vertical path. Bending stresses caused in the hopper slopes and floor frame of conventional trailers by indirect weight transmission is avoided.

24 Claims, 12 Drawing Sheets

(58) Field of Classification Search
CPC ..... B60P 1/02; B60P 1/14; B61D 3/20; B61D 5/00; B61D 5/002; B61D 7/02; B61D 7/06; B61D 7/12; B61D 7/26; B61D 7/32
USPC ..... 298/8 H, 24, 29, 7, 27, 30, 34, 22 R, 28, 298/17 T, 31, 35 M; 105/247, 404; 414/469, 495, 526, 517, 523, 572, 679, 414/744.2

See application file for complete search history.

(56) References Cited

U.S. PATENT DOCUMENTS

| | | | | |
|---|---|---|---|---|
| 4,484,527 A | * | 11/1984 | O'Hara | B61D 7/00 105/247 |
| 4,484,528 A | * | 11/1984 | Anderson | B61D 7/00 105/248 |
| 4,696,088 A | * | 9/1987 | Miller | B61D 7/02 29/401.1 |
| 4,696,237 A | * | 9/1987 | Miller | B61D 7/02 105/248 |
| 6,502,518 B1 | * | 1/2003 | Miller | B61D 7/00 105/247 |

FOREIGN PATENT DOCUMENTS

| | | |
|---|---|---|
| CA | 2559003 A1 | 3/2008 |
| CN | 201357832 | 12/2009 |
| CN | 203637827 | 6/2014 |

OTHER PUBLICATIONS

Notice of Acceptance issued on the corresponding Australian application No. 2014317761 dated Jun. 15, 2016, 2 pages.
Written Opinion for Application No. PCT/CA2014/050829, dated Nov. 26, 2014, 4 pages.
International Patent Application No. PCT/CA2014/050829, International Search Report dated Nov. 26, 2014.
Australian Patent Application No. 2014317761, Examination Report dated Mar. 10, 2016.

* cited by examiner

UNIBODY HOPPER TRAILER

CROSS REFERENCE TO RELATED APPLICATIONS

This application claims the benefit of U.S. Provisional Patent Application Ser. No. 61/874,655, filed Sep. 6, 2013, which is hereby incorporated by reference.

FIELD

The present disclosure relates generally to hopper trailers.

BACKGROUND

Hopper truck trailers are in common use for towing by truck tractors to transport bulk material such as grain, gravel, coal, salt, fertilizer, and the like. The bulk material is typically loaded into an open top of the trailer into hoppers formed in the trailer and unloaded via chutes provided beneath. Tarps or other flexible sheet materials are typically used to cover the open top during transport.

Partial cross-sectional views of a known hopper trailer 100 are shown in FIGS. 1 to 3. The known hopper trailer 100 has a container, or box, with opposing sidewalls 101 and end walls (not shown). The opposing sidewalls 101 are supported by a floor frame 103 including transverse cross members 104 (shown especially in FIG. 2, only one of six cross members 104 identified by a lead line for clarity of illustration). The conventional hopper trailer further has hopper slopes 105 which internally span the sidewalls 101 to form hoppers 102, with a bottom opening 106 and a gate or door (not shown) for selectively opening a bottom chute 107 of the hopper for emptying the hopper through the chute 107 by gravity. Upper cross beams 108 are also typically provided which span and join the sidewalls 101 and support the hopper slopes 105 at an upper end thereof. The known hopper trailer 100 is typically mounted on and carried by a trailer chassis 109 which is in turn mounted on a wheeled suspension 110.

As shown in FIG. 3, the known hopper trailer 100 construction results in an indirect transmission of the weight of a load contained in the hopper to the ground. The weight first bears on the hopper slopes 105 and transfers to the upper cross beams along arrow 111, which it then traverses to the sidewalls along arrow 112, then down the sidewalls along arrow 113, then back across the floor frame cross-members along arrow 114, down through the chassis and suspension along arrow 115, transversely along the axle to the wheel along arrow 116, and finally down to the road or other supporting surface beneath along arrow 117.

The indirect weight transmission typically results in bending stresses at least in the hopper slopes and floor frame, which must therefore be constructed of materials of sufficient strength, and in sufficient dimensions, to resist bending. In particular, in order to redirect the weight from the sidewalls 101 to the chassis 109, it is typically necessary to provide the floor frame 103 with I-beam cross-members 104, which adds to the construction cost and weight of the trailer, as well as its height. Not only does this increase initial manufacturing costs, but it increases the cost of hopper load transport which is dependent at least in part on the weight of the transport vehicle including the weight of the hopper trailer.

It is desirable, therefore, to improve the design of hopper trailers in order to enable a less costly and more efficient solution.

BRIEF DESCRIPTION OF THE DRAWINGS

Embodiments of the present disclosure will now be described, by way of example only, with reference to the attached drawings, as follows.

Where appropriate, like reference characters designate like elements throughout the drawings.

DESCRIPTION

Figure 1:
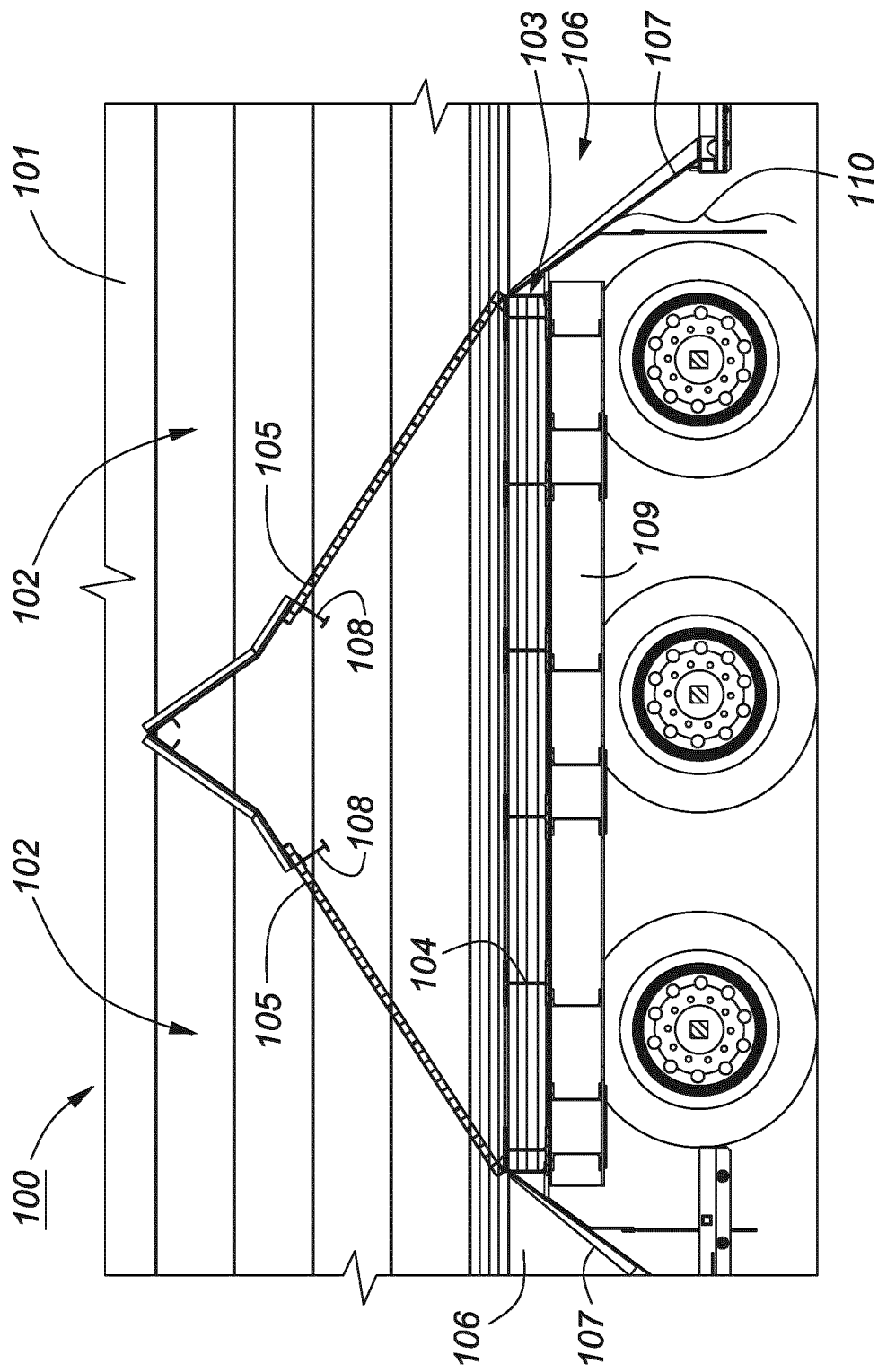
FIG. 1 is a partial cross-sectional side view of a known hopper trailer.
Figure 2:
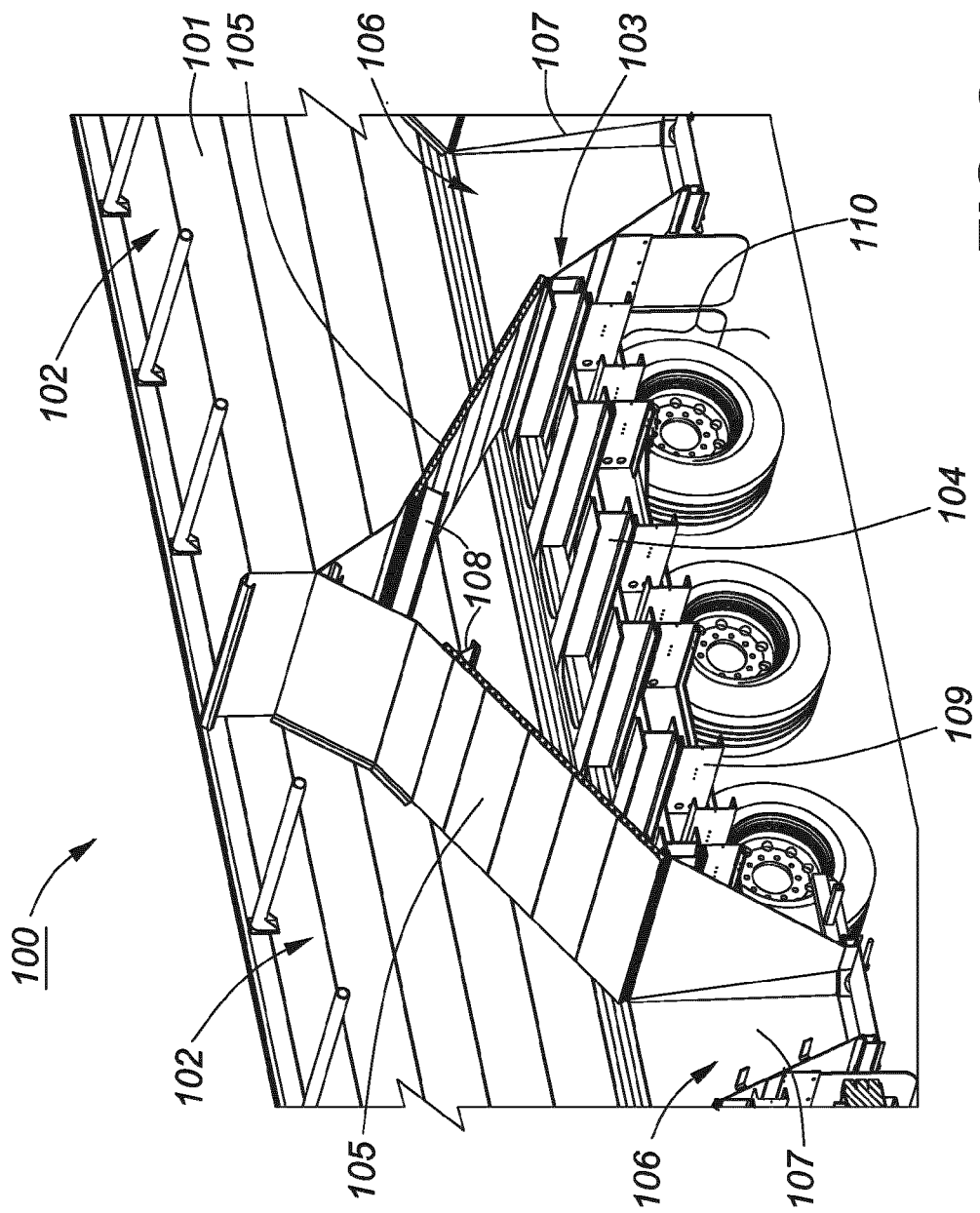
FIG. 2 is a partial cross-sectional isometric view of the known hopper trailer of FIG. 1.
Figure 3:
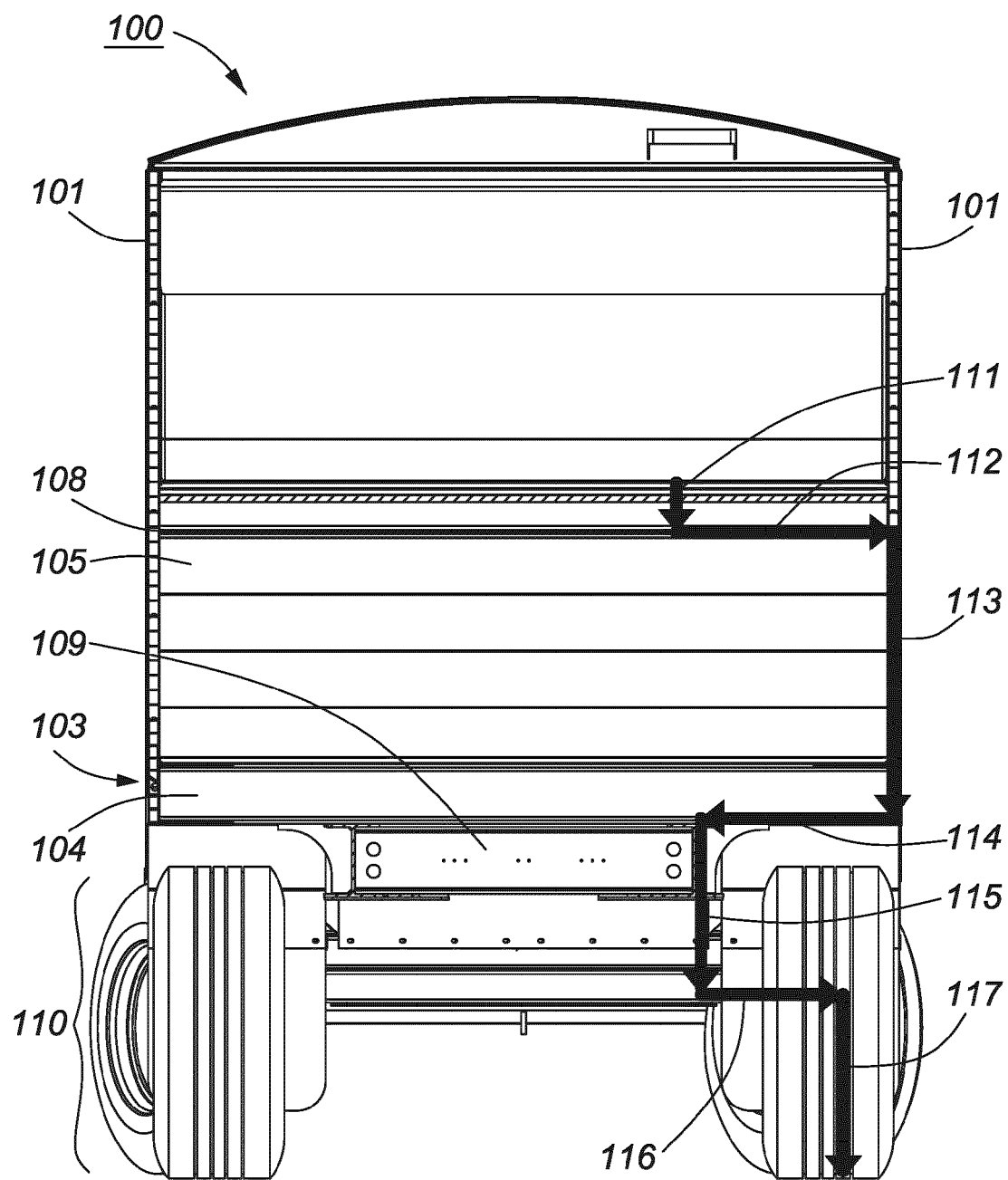
FIG. 3 is a partial cross-sectional end view of the known hopper trailer of FIG. 1 illustrating transference of a weight of a hopper load.

A unibody hopper trailer is described herein which overcomes at least some of the disadvantages of conventional and known hopper trailers indicated above, and additionally provides further advantages. The unibody hopper trailer has a lower overall weight as compared to conventional hopper trailers, leading to lower overall manufacturing costs and enabling lower fuel consumption and a greater payload. The unibody hopper trailer also has a lower overall height as compared to conventional hopper trailers, thereby enabling easier loading of the material by agricultural equipment, among other advantages.

The unibody hopper trailer 200 is illustrated in FIGS. 4 to 8. The trailer 200 includes a container 201 having opposing sidewalls 202, end walls 203, and a top opening 204. The trailer 200 further includes at least one carriage 205 for carrying the trailer on a surface, e.g. a road (not shown).

The trailer 200 is characterized by a longitude which extends parallel to the sidewalls 202, and intersects the end walls 203, and a transverse which extends generally parallel to the end walls 203 and generally perpendicular to the sidewalls 202 and longitude. The adjectives "longitudinal"

and "transverse" are used herein consistently with this definition of the longitude and transverse. The terms "bottom", "downward", "lower", and the like are intended to indicate a position relatively proximal to the ground supporting the wheels of the trailer, or a direction proceeding generally from the top opening of the trailer to the ground. Similarly, the terms "top", "upward", "upper", and the like are intended to indicate a position relatively distal from the ground, or a direction proceeding generally from the ground to the top opening of the trailer. The terms "inward", "inwardly", "inner", and the like are intended to indicate a position or direction relatively proximal to or toward a transverse center of the trailer, while terms such as "outward", "outwardly", "outer", and the like are intended to indicate a position or direction relatively distal or away from the transverse center of the trailer.

Each carriage 205 includes a chassis 206 mounted to and carried by a wheeled suspension 207, including a suspension 208 (shown particular in FIG. 8), one or more axles 209 (shown particular in FIG. 8), and corresponding sets of wheels 210 mounted to the axles 209. The suspension may include any components known in the art, including suspension hangers 211. As shown, the wheeled suspension of each carriage may have any number of axles 209, including in some cases three axles or one axle. Carriages 205 having three axles 209 are particularly shown in FIGS. 6 and 7. In either case, the corresponding chassis 206 and suspension 208 may be provided with a configuration and size appropriate for the number of axles 209. In some cases, the wheels 210 of a carriage 205 are fixed in that they do not turn about a vertical axis. For example, the three-axle carriage 212 shown particularly in FIGS. 6 and 7 may be fixed in this way. In other cases the suspension 208 and wheels 210 are configured for turning of the wheels 210 about a vertical axis, for example the wheels 210 of the one-axle carriages 213 shown in FIGS. 5 and 6 may be turnable in this way. In some cases, the carriage 205 is configured such that the wheels 210 remain lowered for contact with the ground at all times, such as the three-axle carriage 212, whereas in other cases the carriage is configured to enable raising of the wheels from the ground, such as either or both of the one-axle carriages 213, wherein another carriage or carriages 205, such as the three-axle carriage 212, remain lowered to carry the container 201.

In general, the trailer 200 is configured and constructed so as to dispense with any floor frame 103 as is required in known and conventional trailers 100 to transfer the load of bulk material carried in a hopper 102 from the sidewalls 101 back to the truck chassis 109. While the principles discussed herein are particular useful in application to a hopper trailer—and the embodiments described below and the drawings generally concern hopper trailers—it will be appreciated that such principles are equally applicable to trailers different from hopper trailers. The inventive solution described herein provides a means of carrying a trailer container and cargo carried therein different from the conventional approach of supporting the container by a floor frame which is carried on a trailer chassis.

Thus, in some embodiments, the inventive solution is embodied in a trailer 200, which in some embodiments is a hopper trailer, and in other embodiments is trailer type different from a hopper trailer. The trailer 200 includes a carriage 205 which includes a chassis 206 mounted on and carried by a wheeled suspension 207. The trailer 200 has a load transfer plate 214 mounted vertically on and carried by the chassis 206. The load transfer plate 214 is mounted directly on an upper surface 215 (shown particularly in FIGS. 6 to 8) which in some embodiments is an upper surface of the chassis 206; in other embodiments, the carriage 205 further includes a frameless floor 216 (shown in FIG. 7) sandwiched by the load transfer plate 214 and chassis 206, and the load transfer plate 214 is mounted on the upper surface 215 which is an upper surface of the floor 216. In other embodiments, the frameless floor 216 is not sandwiched between the chassis 206 and load transfer plate 214, but instead extends from each side of the chassis 206 to an adjacent sidewall 202, and may also extend between longitudinal beam segments 240 of the chassis 206. The container 201 has at least one sloping wall 217 spanning between and adjoining the opposing sidewalls 202. The sloping 217 wall is mounted on and carried by the load transfer plate 214. The sidewalls 202 are mounted to and carried by the sloping wall 217. The trailer 200 has a coupler 218 attached to a front end of the container for mounting to a trailer hitch.

In some embodiments, the trailer has a second sloping wall 220 adjacent to the first sloping wall 219. The second sloping wall 220 also spans between and adjoins the opposing sidewalls 202. The first sloping wall 219 and second sloping wall 220 approach upwardly and diverge downwardly. The second sloping wall 220 is also mounted on and carried by the load transfer plate 214. The sidewalls 202 are further mounted to and carried by the second sloping wall 220. The load transfer plate 214 has a triangular shape defined by the upper surface 215 of the chassis 206 or floor 217, as the case may be, and respective lower surfaces 221, 222 (shown particularly in FIGS. 6 and 7) of the first sloping wall 219 and the second sloping wall 220.

In some embodiments, the container 201 comprises a hopper 223 formed by the sloping wall 217, the sidewalls 202, and another wall 224 (shown particularly in FIG. 4) opposing the sloping wall 217. A bottom of the hopper 223 forms a discharge opening 225 for emptying a bulk material carried in the hopper 223, and a gate 226 (or door) for selectively retaining the bulk material in the hopper 223.

Figure 8:
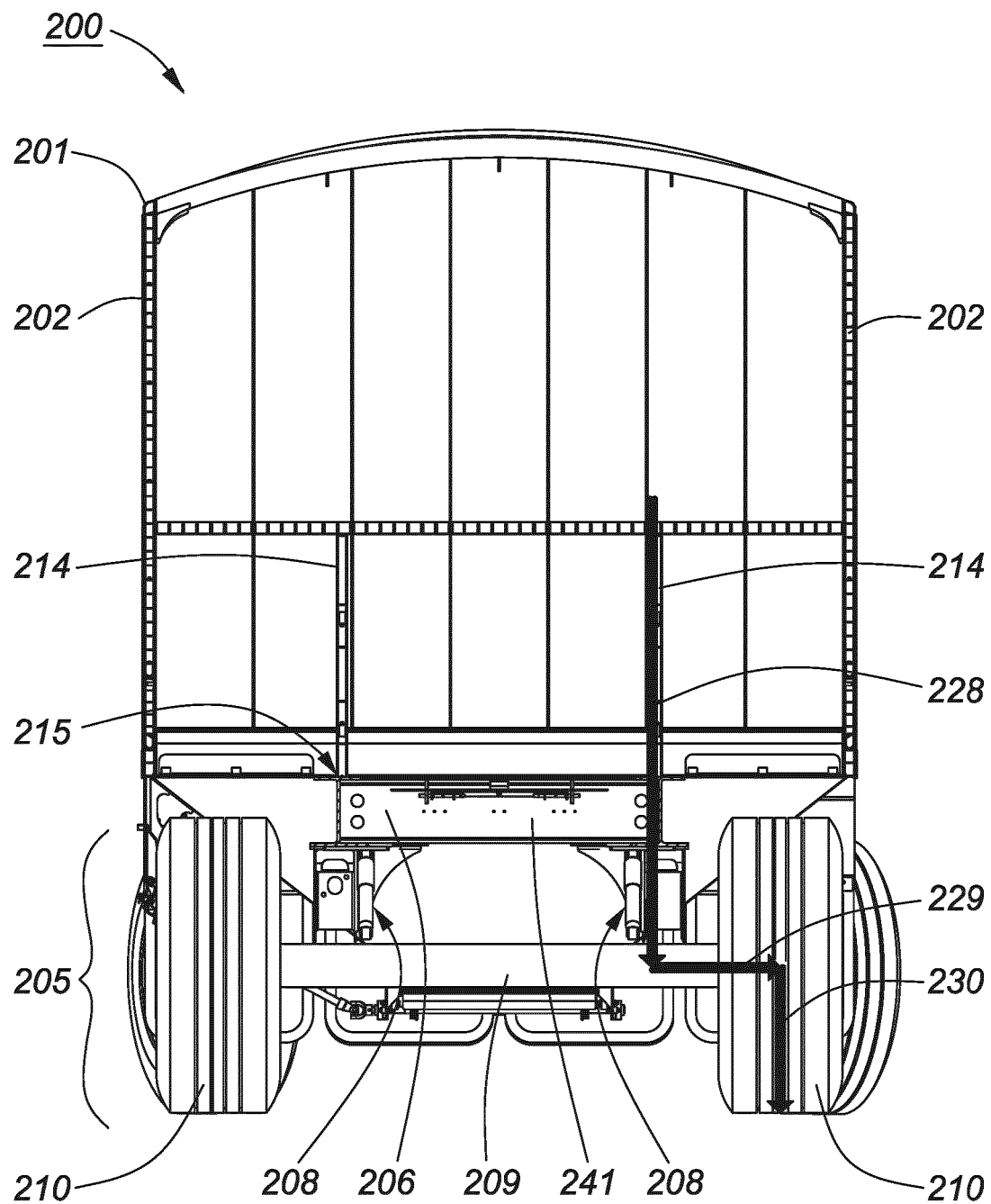
FIG. 8 is a partial cross-sectional end view of the unibody trailer of FIG. 4 illustrating transference of a weight of a hopper load.

As shown in FIG. 8, at least a part of a weight of the bulk material carried in the hopper 223 is transferred vertically downwardly through the sloping wall 217 to the load transfer plate 214, and then vertically downwardly through the load transfer plate 214, through the frameless floor 216 (if present and sandwiched between the chassis 206 and load transfer plate 214), through the chassis 206, through the suspension 208 to the axle 209, all along arrow 228, out to the wheels along arrow 229, and down to the road along arrow 230. In particular, the weight is transferred directly downwardly along arrow 228, without substantial deflection from a vertical path. In this way, the bending stresses caused in the hopper slopes and floor frame of conventional trailers by indirect weight transmission is avoided.

Where the trailer is a hopper trailer, the trailer 200 may have one or more integral hoppers 231 formed in the container 201, each hopper 231 having a pair of generally opposing generally planar hopper slopes (or sloping walls) 232 (shown particularly in FIG. 4), each hopper slope 232 extending transversely and joining the opposing sidewalls 202 at opposite edges of the hopper slope 232. Each opposite edge of the hopper slope 232 is attached or fixed to a corresponding inner surface 233 of a corresponding one of the opposing sidewalls 202. In some embodiments, the hopper slope 232 edges are welded to corresponding inside surfaces 233 of the opposing sidewalls 202.

A chute 234 having a number of chute slopes 235 is formed or mounted at the bottom of each hopper 231, and extends below a bottom of the container 201. In some embodiments, the chute slopes 235 are formed as extensions of corresponding hoppers slopes 232 below the bottom of the container 201. In other embodiments, additional chute slopes 235 different from the hopper slopes 232 are provided and mounted beneath the hopper slopes 232. In either case, each chute 234 has a bottom opening 236 and a door or gate 237 provided at the bottom opening for selectively closing the bottom opening 236. When closed, the gate 237 is configured to contain and support a bulk material in the hopper 231. When open, the bottom opening 236 is configured to permit passage of the bulk material by the force of gravity.

In some embodiments, two of the hoppers 231 are adjacent, respective hopper slopes 232 of the two hoppers 231 are also adjacent, and the trailer 200 also has at least one load transfer plate 214 contacting and carrying the hopper slopes 232 from beneath the hopper slopes 232. The load transfer plate 214 is supported directly or indirectly by the chassis 206 of a corresponding carriage 205 provided beneath the load transfer plate 214. As noted above, the chassis 206 is mounted to and carried by a wheeled suspension 207, including a suspension 208, axles 209, and wheels 210, and the chassis 206 and wheeled suspension 207 together constitute a carriage 205. The load transfer plate 214 is sized and located substantially to form a plane which adjoins and is described by lower surfaces of the hopper slopes 232, and an upper surface 215 of the chassis 206 (or frameless floor 216 sandwiched between the load transfer plate 214 and chassis 206) carrying the load transfer plate 214, so as to form a triangle. Respective weights of the hopper slopes 232 and any weight borne thereby (e.g. of bulk material contained in the hoppers 231) is supported at a bottom edge of the load transfer plate 214 by the chassis 206.

The hopper slopes 232 of the two adjacent hoppers 231 are sized and located so as to meet at respective upper edges thereof to form an upper joint 238 which spans the transverse of the container 201. In some embodiments, the hopper slopes 232 are sized so as to span as well a height of the container 201—that is, to extend from the respective bottom openings 236 of the hoppers 231 to a height proximal the top opening 204. In some embodiments, the adjacent hopper slopes 232 form at the upper joint 238 a further joint with a corresponding bottom edge of a vertical separating wall 239 which extends upwardly toward the top opening 204 of the container 201, to divide the two hoppers 231. The vertical separating wall 239 also extending transversely and joining the opposing sidewalls 202 at opposite edges of the hopper slope 232. Each opposite edge of the hopper slope 232 is attached or fixed to a corresponding inner surface 233 of a corresponding one of the opposing sidewalls 202. In some embodiments, the hopper slope 232 edges are welded to corresponding inside surfaces 233 of the opposing sidewalls 202. In some embodiments, the vertical separating wall 239 ends upwardly at and forms a further joint with one of the tarp support rails 253 extending transversely across the container 201.

As noted above, the load transfer plate 214 is sized and located substantially to form a plane which adjoins and is described by respective lower surfaces of the adjacent hopper slopes 232 and an upper surface 215 of a corresponding chassis 206 (or frameless floor 216 if present and sandwiched between the chassis 206 and load transfer plate 214), so as to form a triangle. The load transfer plate 214 rests upon, and is supported at a bottom edge thereof by, the chassis 206. In one embodiment, the load transfer plate 214 is mounted on and carried by a longitudinal beam segment 240 (shown particularly in FIGS. 6 and 7) of the chassis 206, which in turn is mounted on and carried by a suspension 208, which is mounted on and carried by the axles 209 and wheels 210. In one embodiment, the beam segment 240 is mounted to at least one suspension hanger 211 of the suspension 208.

As noted above, the chassis 206 and wheeled suspension 207 may together constitute a carriage 205. In some embodiments, the chassis 206 is a partial frame chassis, meaning the chassis 206 has a length less than a length of the trailer 200, or a length less than a longitudinal distance spanned by all of the wheels 210 of the trailer 200. In some embodiments, the longitudinal beam segment 240 of the chassis 206 extends only to a length of a bottom edge of the load transfer plate 214, such that substantially an entire length of the bottom edge of the load transfer plate 214 is mounted on and is carried by an upper surface of the beam segment 240. In other embodiments, the beam segment 240 has a length spanning longitudinally the corresponding carriage 205, and in particular the wheels 210 or axles 209 of the carriage 205. In some embodiments, the length of the beam segment 240 is substantially equal to the length of the bottom edge of the load transfer plate 214. In other embodiments, the length of the beam segment is greater than the length of the bottom edge of the load transfer plate 214. In other embodiments, the length of the beam segment 240 is substantially equal to a longitudinal spacing of bottom edges of the hopper slopes 232 or adjacent hoppers 223.

Figure 4:
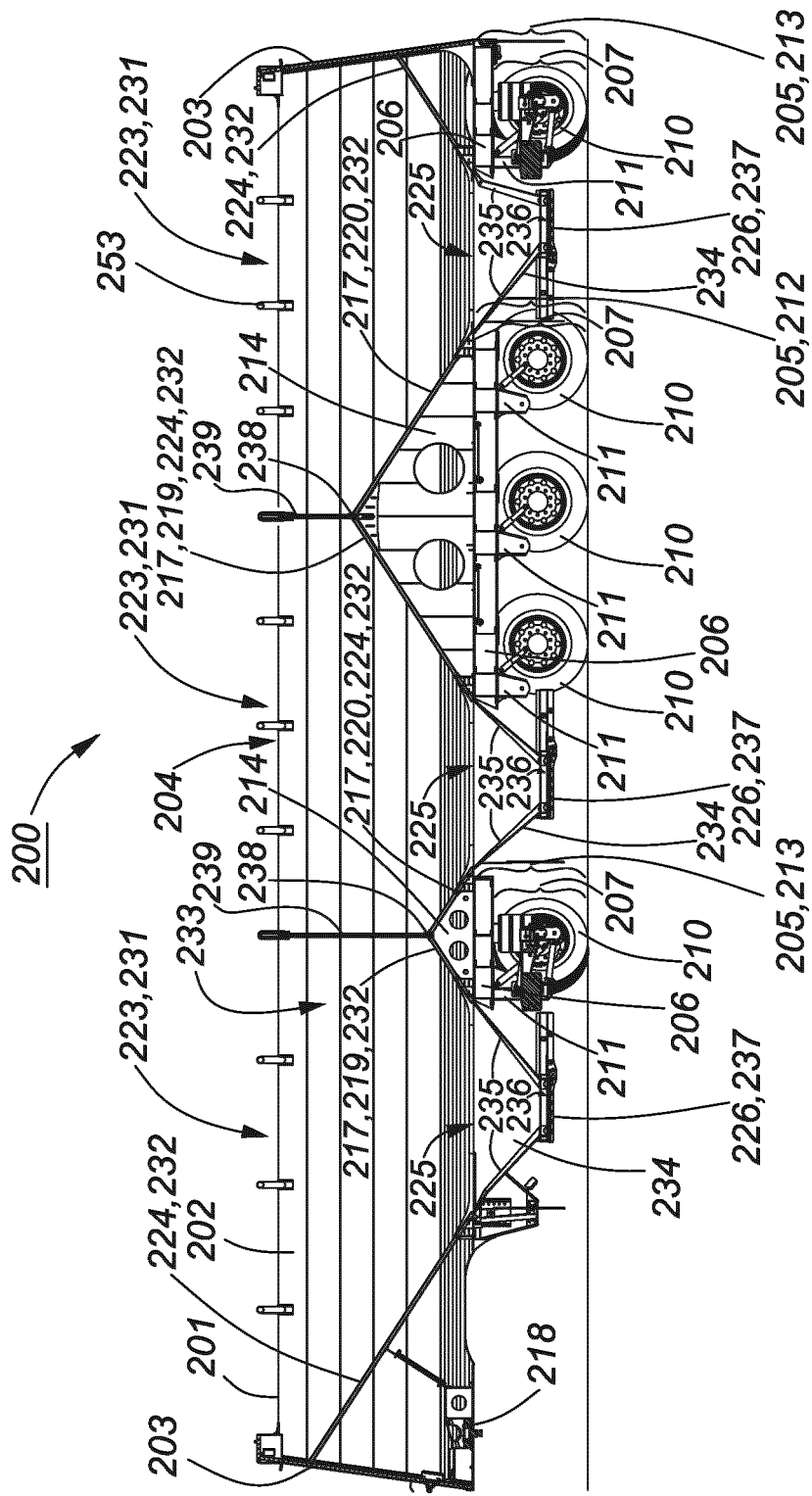
FIG. 4 is a cross-sectional side view of a unibody trailer.
Figure 5:
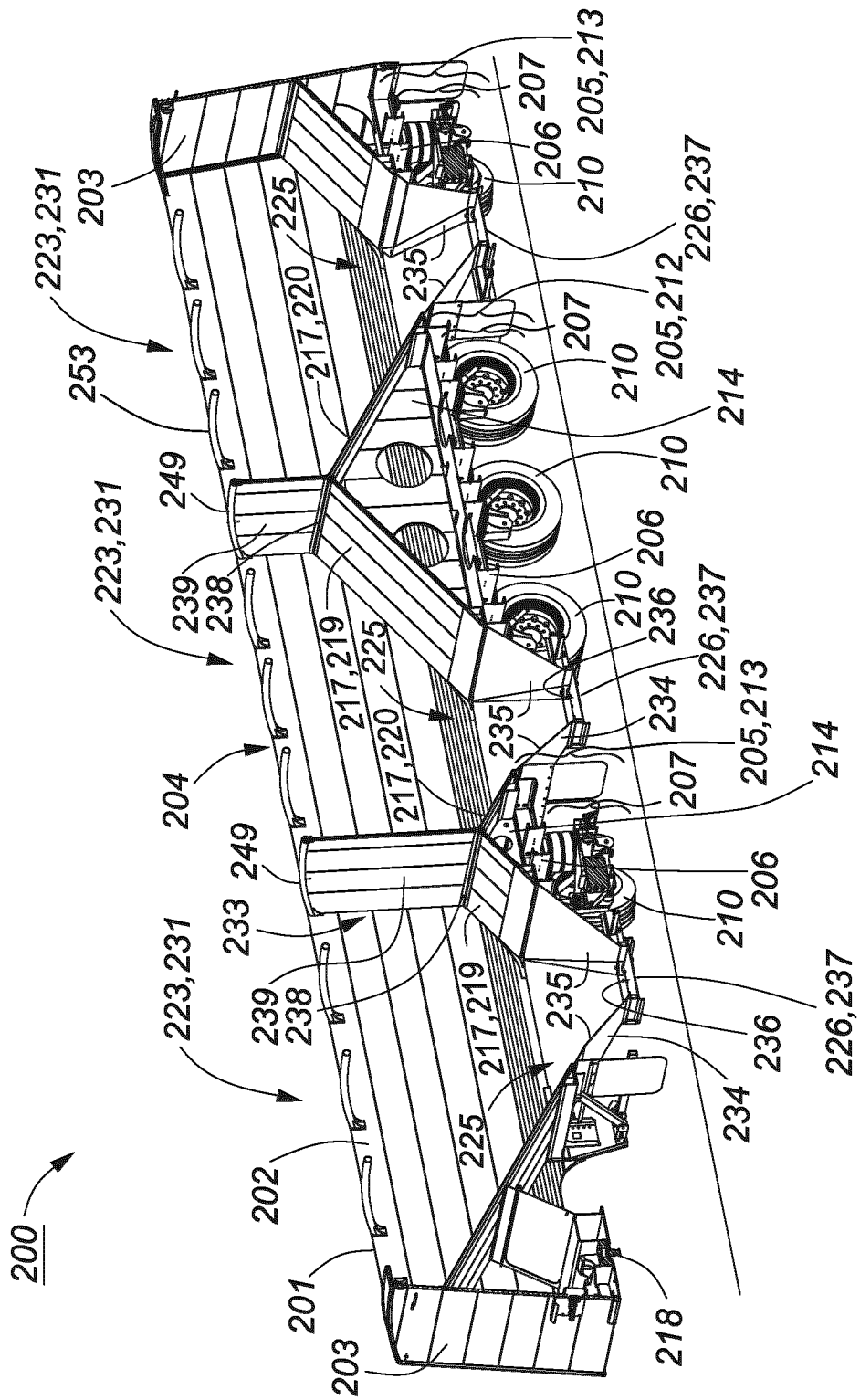
FIG. 5 is a cross-sectional isometric view of the unibody trailer of FIG. 4.
Figure 6:
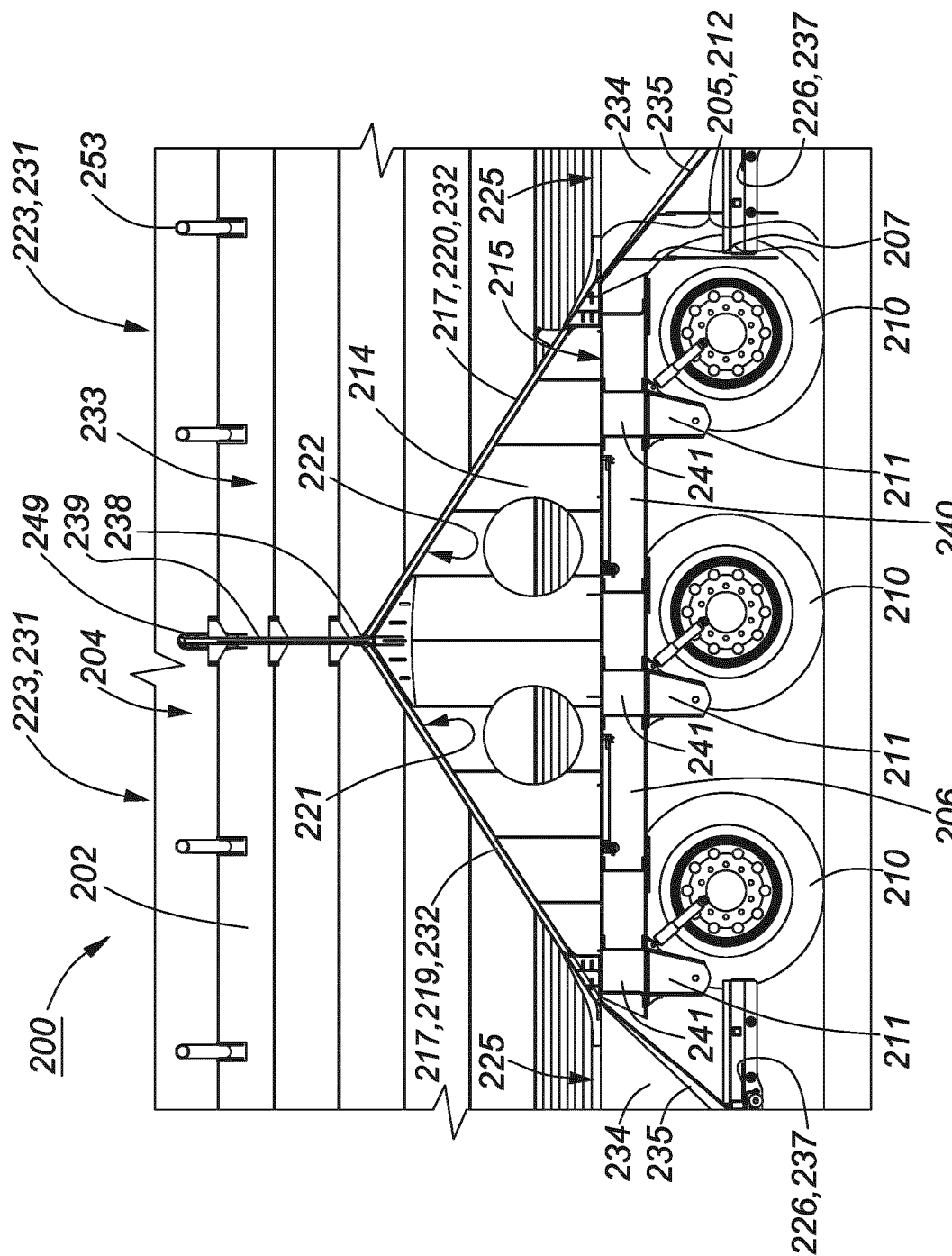
FIG. 6 is a partial cross-sectional side view of the unibody trailer of FIG. 4 particularly illustrating aspects of the trailer associated with a three-axle carriage of the trailer.
Figure 7:
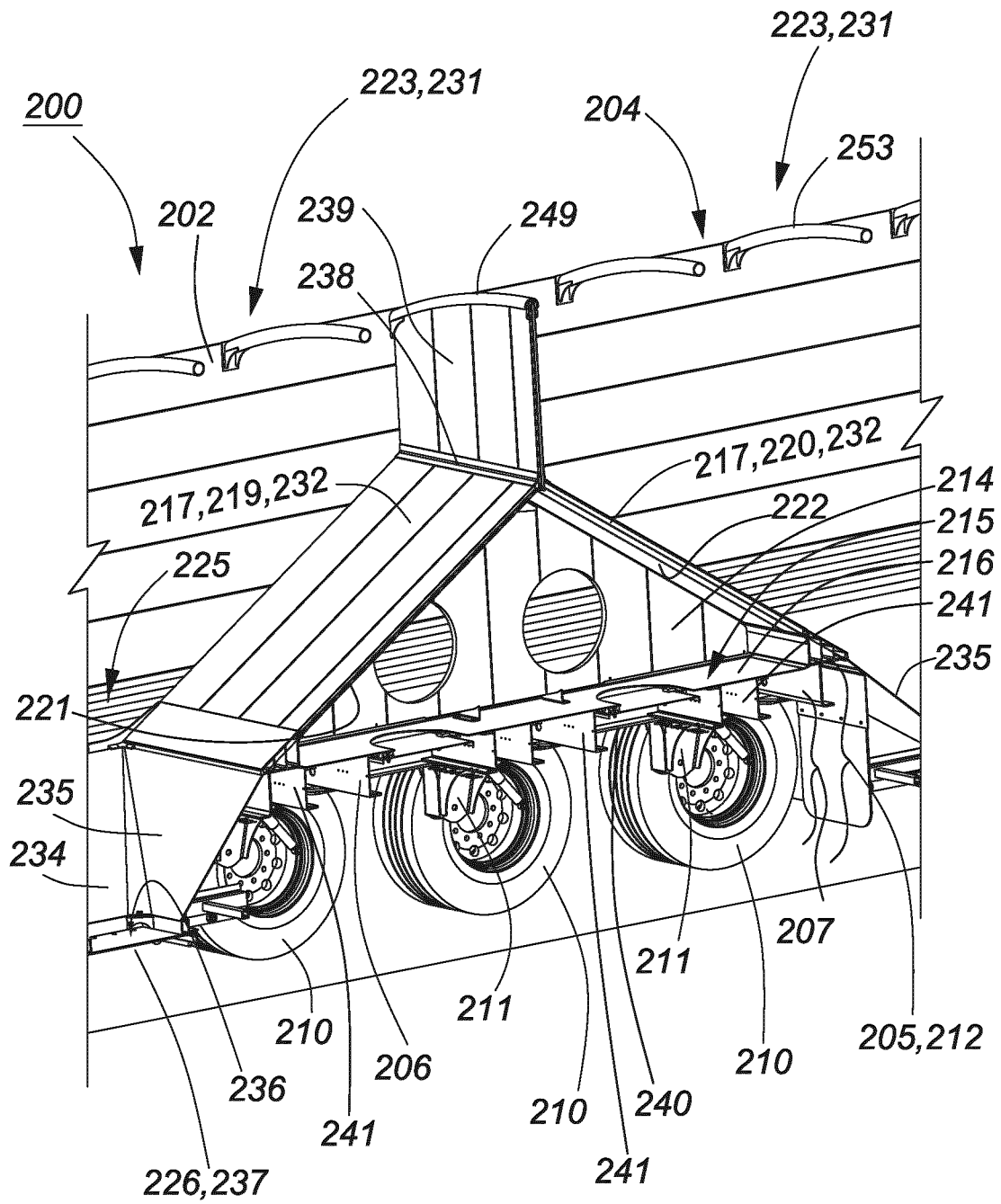
FIG. 7 is a partial isometric cross-sectional view of the unibody trailer of FIG. 4 particularly illustrating the aspects of the trailer associated with the three-axle carriage of the trailer shown in FIG. 6.

In embodiments where the load transfer plate is triangular, for a given slope of a sloping wall supported by the load transfer plate, a height of the load transfer plate will be proportional to a length of the bottom edge of the load transfer plate. In embodiments where the bottom edge of the load transfer plate has a length substantially equal to the length of a longitudinal beam segment of the chassis supporting the load transfer plate, the height of the load transfer plate will depend upon the number of axles of the carriage since a longitudinal extension of a carriage will depend at least in part on the number of axles of the carriage. This relationship is illustrated in FIGS. 4 and 5 by a comparison of the respective heights of the load transfer plates 214 mounted on the one-axle carriage 213 and the three-axle carriage 212. For a container 201 of a given height, therefore, a height of any vertical separating wall 239 provided above a particular carriage 205 will tend to decrease with an increase in the number of axles of the carriage 205, as is also evident from a comparison of the respective heights of the vertical separating walls 239 provided above the one-axle carriage 213 and the three-axle carriage 212 in FIGS. 4 and 5.

It will therefore be appreciated that in some configurations, including configurations with a carriage 205 having a large number of axles, the hopper slopes 232 may extend all the way up to the top opening 204 of the trailer 200, such that the upper joint 238 is proximal the top opening 204, and there is no vertical separating wall 239.

Figure 11:
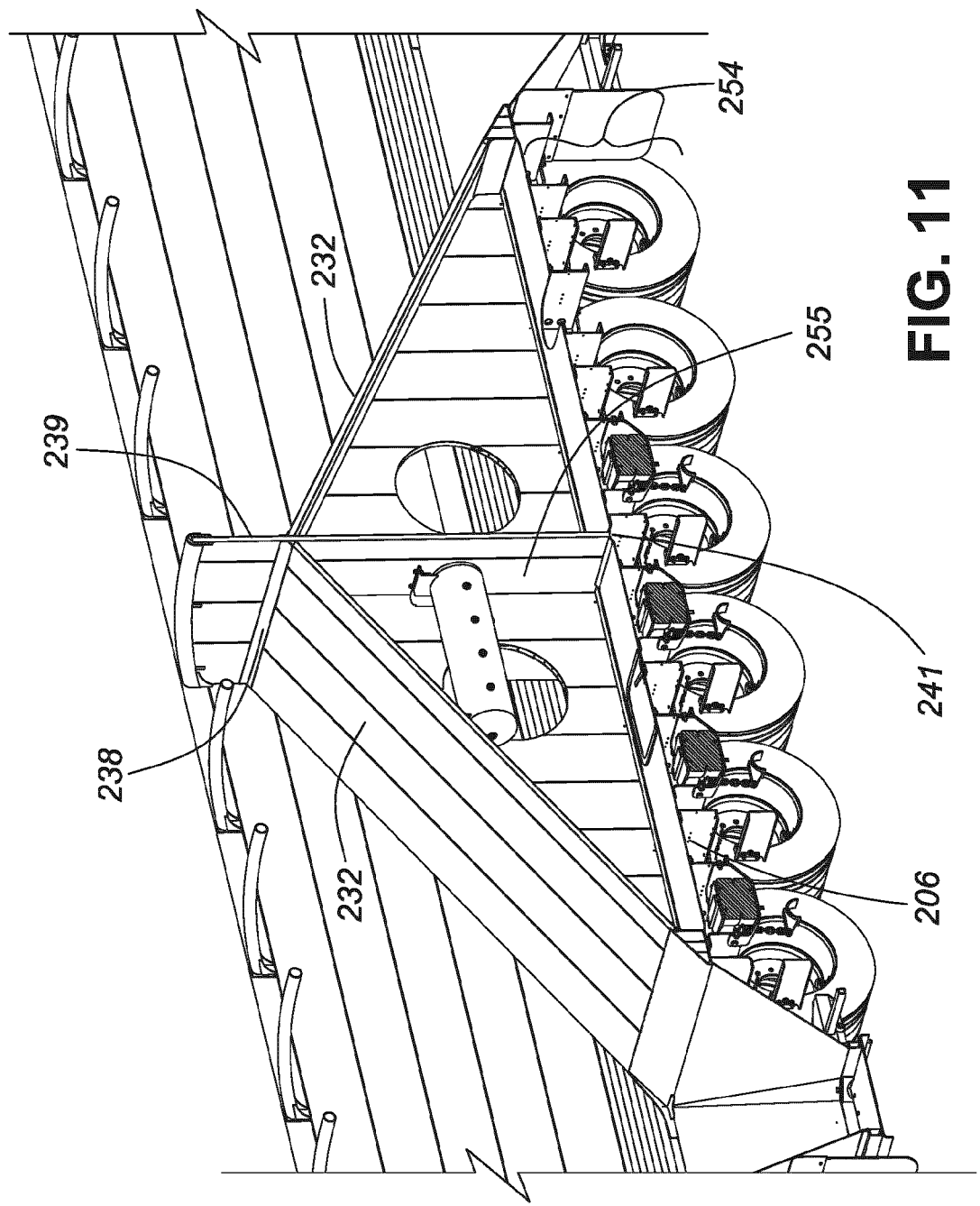
FIG. 11 is a partial isometric cross-sectional view of a unibody trailer having an 8-axle carriage with a full-height vertical separating wall.

In some embodiments, for example having an eight-axle carriage 254 as shown in FIG. 11 (though any number of axles is possible), the vertical separating wall 239 has a lower portion 255 which extends beneath the upper joint 238 down to the chassis 206, wherein the vertical separating wall 239 is mounted on and carried by the chassis 206. In some embodiments, the vertical separating wall 239 so provided is mounted on and carried by a cross-member 241 of the chassis 206. The lower portion 255 also In some embodiments, each longitudinal beam segment 240 of the chassis 206 is mounted to the wheeled suspension 207 between transversely opposite wheels 210 of the wheeled suspension 207.

In general, the load transfer plate 214 is sized and positioned so as to be supported from below by corresponding wheels 210 of the carriage 205 carrying the load transfer plate 214. In other words, the load transfer plate 214 is positioned vertically above axles 209 to which the corresponding wheel or wheels 210 are mounted, and is sized such that a weight of the load transfer plate 214 and any weight borne by the load transfer plate 214 is transferred vertically downward, via the chassis 206, suspension 208, and axles 209 to the corresponding wheel or wheels 210.

In some embodiments, for each hopper slope 232 of each hopper 231, the trailer 200 has two load transfer plates 214 supporting the hopper slope 232 from beneath the hopper slope 232. The two load transfer plates 214 are spaced transversely and cooperate to support the hopper slope 232 and transmit the weight of the hopper slope 232 and any weight borne by the hopper slope 232 downwardly to the chassis 206 supporting the load transfer plates 214. In one embodiment, the chassis 206 has a different longitudinal beam segments 240 corresponding to each load transfer plate 214, and the load transfer plates 214 are spaced and located such that each load transfer plate 214 is mounted on and carried by an upper surface of a corresponding beam segment 240. As noted above, in some embodiments each beam segment 240 extends to a length of the bottom edge of the load transfer plate 214, or to a length spanning longitudinally the suspension hangers of the corresponding carriage 205 mounted to axles 209 corresponding to a set of wheels 210. In one embodiment, the chassis 206 further comprises one or more cross-members 241 (shown particularly in FIGS. 6 and 7) extending transversely in a horizontal plane intersecting the beam segments 240, and intersecting and mounted to the beam segments 240, to form a frame supporting the load transfer plates 214, and supported by the wheeled suspension 207 beneath the frame.

The trailer 200 may include a number of carriages 205 of different sizes, including in some embodiments a mix of three-axle carriages 212 and one-axle carriages 213. In such embodiments, the load transfer plates 214 respectively carried by such differently-sized carriages 205 may also be differently sized, with the load transfer plates 214 carried by the one-axle carriages 213 being smaller than the load transfer plates 214 carried by the three-axle carriages 212. Any number and combination of differently sized carriages 205 and corresponding load transfer plates 214 is possible.

As described above, the sidewalls 202 and end walls 203 of the container 201 are mounted to and carried by the sloping walls 217, 232, which are mounted to and carried by load transfer plates 214, which are mounted to and carried by the chassis 206 and wheeled suspension 207. As such, the sidewalls 202 and end walls 203 are in essence hung or suspended by the load transfer plates 214, which is different from the approach in conventional trailers wherein the sidewalls 101 (and any end walls and roof) are supported first by a floor and floor frame 103, wherein the floor frame 103 is necessary to transfer the weight borne by the sidewalls 101 transversely back to a chassis 109. Such difference enables a different construction of sidewalls in particular, as in the inventive trailer 200 the sidewalls 202 bear substantially less weight of any carried bulk material or other cargo. The sidewalls 202 in the inventive trailer 200 function primarily to provide longitudinal structure to the trailer 200, and provide sidewalls to any hoppers 223 formed therein.

With lesser mechanical demands, the sidewalls 202 may in some embodiments be formed of lighter materials, further resulting in a cost savings at the time of manufacturing as well as operation.

Figure 9:
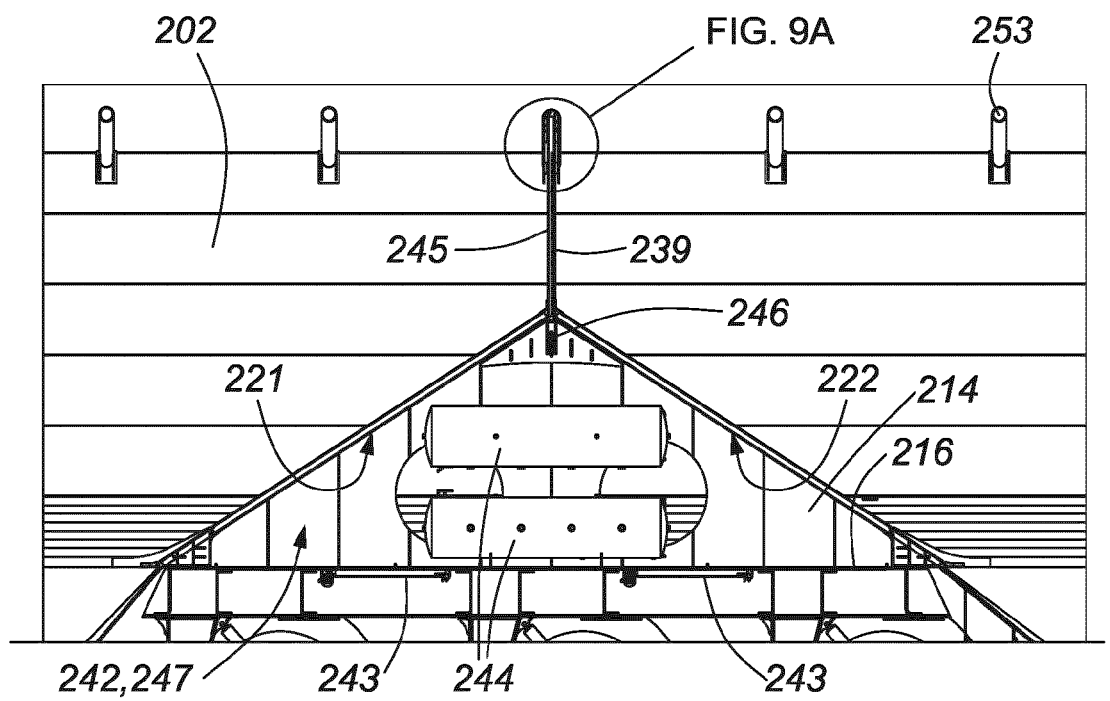
FIG. 9 is a partial cross-sectional side view of the unibody trailer of FIG. 4 particularly illustrating an enclosed compartment and venting apparatus of the trailer.

As noted above, in some embodiments a frameless floor 216 is provided on an upper surface of a chassis 206 of a carriage 205. In other embodiments, the frameless floor 216 is not sandwiched between the chassis 206 and load transfer plate 214, but instead extends from each side of the chassis 206 to an adjacent sidewall 202, and may also extend between longitudinal beam segments 240 of the chassis 206. In either case, the frameless floor 216 may be sized and configured so as locally to enclose the container 201 from below, thus preventing the accumulation of road dirt or other contaminants about the load transfer plates 214 above the frameless floor 216. As shown in FIG. 9, the enclosed compartment 242 formed and described by the floor 216, lower surfaces of adjacent hopper slopes 221, 222, and portions of the sidewalls 202, may be used for storage, and the floor 216 or sidewalls 202 may be provided with one or more doors or hatches 243 for providing access to the enclosed compartment 242. As shown in FIG. 9, in some embodiments, one or more such enclosed compartments 242 may be used to store air tanks 244, which may be used in for form part of a pneumatic braking system.

The container 201, including the sloping walls 217, 232, may be formed and manufactured of any materials and by any methods as are known in the art and which provide the requisite mechanical properties indicated or implied herein. In some embodiment, the sidewalls 202, end walls 203, sloping walls 217, 232, and vertical separating wall 239 are formed of aluminum panels. In some embodiments the aluminum panels are hollow-core extruded panels. In some embodiments, the panels are joined at their intersections by welds. In other embodiments, the panels are joined at their intersections by fasteners such as rivets or bolts.

As noted above, it is known in the art for hopper trailers to have an open top for the loading of bulk materials, and the open top is then covered with a tarp or other sheet material to protect the bulk material during transport. The trailer 200 may also be provided with a number tarp support rails 253 extending transversely across the top opening 204 and spaced longitudinally, so as to support a tarp rested on the tarp support rails 253 and tied down to the trailer 200.

Figure 9A:
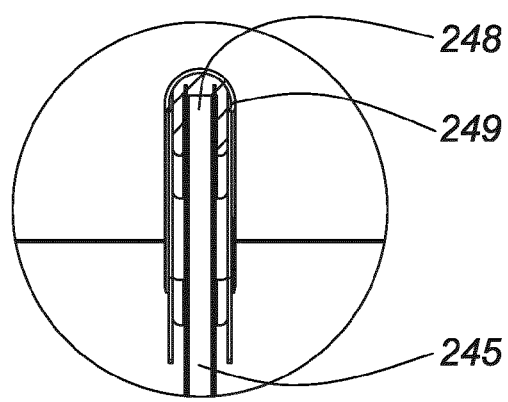
FIG. 9A is an enlarged partial view of a tubular vent hood of the venting apparatus shown in FIG. 9.

As is known in the art, when bulk material, such as grain, flows out of a hopper having a top opening covered by a flexible sheet such as a tarp, a drop in air pressure is created in the space below the tarp which tends to suck the tarp down. It is therefore advantageous to provide venting in the hopper to equalize the air pressure and to prevent tarp suck-down during emptying of the hopper. As shown in FIGS. 9 and 9A, in some embodiments of the inventive trailer 200, at least one vertical separating wall 239 is provided with a vertical channel 245 extending a height of the vertical separating wall 239, with a bottom opening 246 into an enclosed space 247 adjacent one of the load transfer plates 214, e.g. an enclosed compartment 242, and an upper opening 248 about the top opening 204 of the container 201. The vertical channel 245 thus provides a vent for passage of air between the enclosed space 247 and the top opening 204 of the container 201. Where the vertical separating wall 239 is formed of hollow-core extruded panels, a plurality of vertical channels 245 is provided by the hollow channels in the extruded members forming the panel. A tubular vent hood 249 may be provided at a top edge of the vertical separating wall 239 so as to prevent blockage of the upper opening 248 by the tarp (not shown). If the enclosed space 247 is fully enclosed, as in the case of an enclosed compartment 242 described above, then an access door 243 may be opened to permit venting through the door opening. As such, ventilation is achieved by venting up through any access door opening or other opening to the enclosed space 247, and up through the vertical separating wall 239 or vertical channel 245, and out from under a tubular vent hood 249. Any number of vertical separating walls 239 can be provided with vertical channels 245 in this way, to provide ample ventilation for emptying of all hoppers 231 without tarp suck-down. In one embodiment, the trailer 200 has two vertical separating walls 239 having such vertical venting channels 245.

Figure 10A:
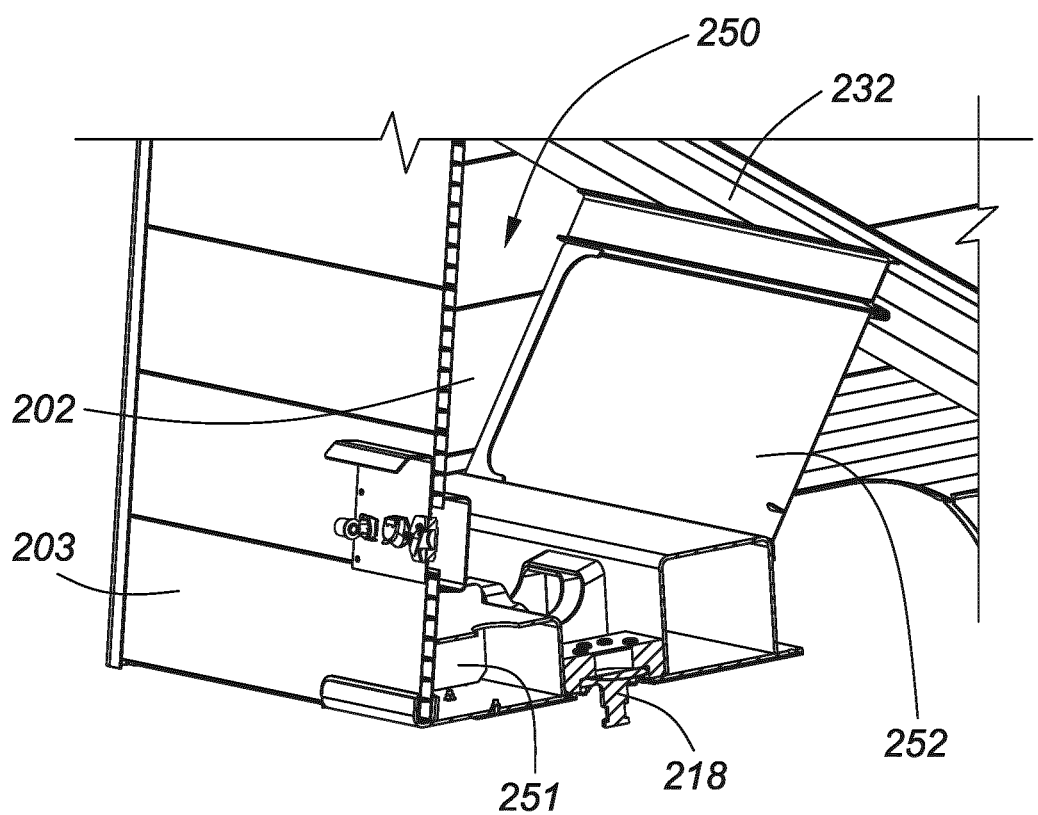
FIG. 10A is a partial isometric cross-sectional view of the unibody trailer of FIG. 4 particularly illustrating a forward coupler compartment having an access hatch in a closed position.
Figure 10B:
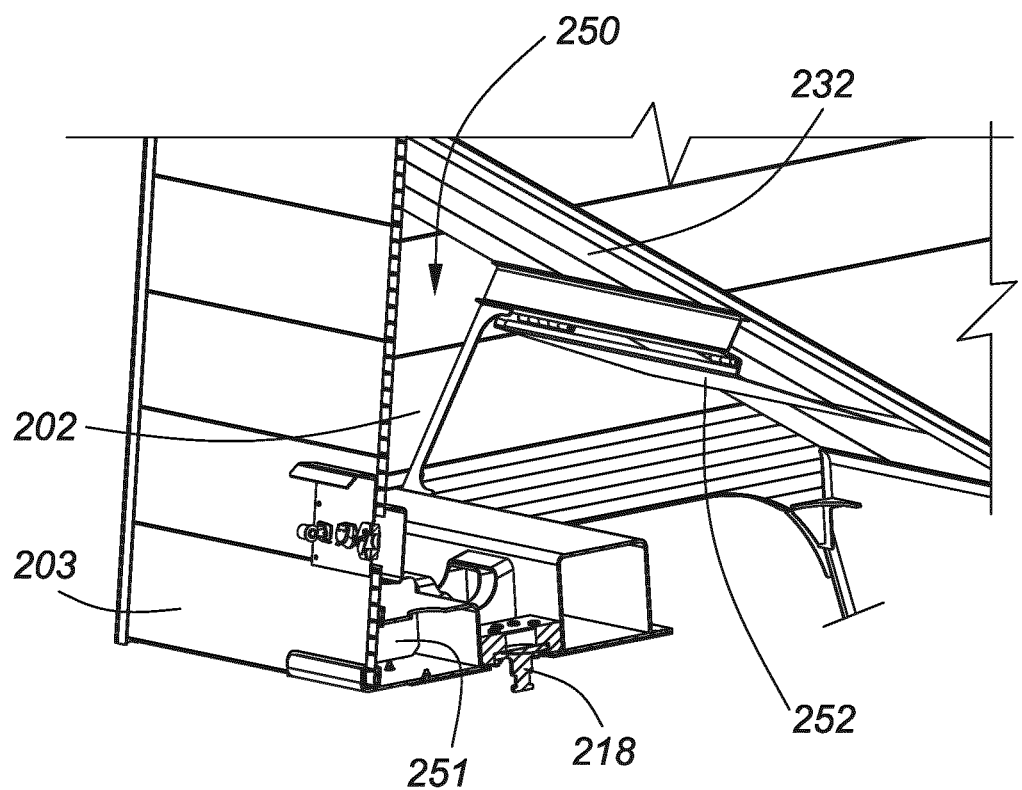
FIG. 10B is a partial isometric cross-sectional view of the unibody trailer of FIG. 4 particularly illustrating the forward coupler compartment shown in FIG. 10A having the access hatch in an open position.

As noted above, the trailer 201 also has a coupler 218 attached to a front end of the container 201 for mounting to a trailer hitch (not shown). As shown in FIGS. 10A and 10B, the container 201 may be provided at a front end of the container 201 with a coupler compartment 250 formed by an end wall 203 at a front of the container 201, adjacent sidewalls 202, a bottom surface of an adjacent hopper slope 232, and a coupler frame 251 supporting the coupler 218, and an access hatch 252. As with the enclosed compartments 242 described above, the access hatch 252 of the coupler compartment 250 may be closed, as shown in FIG. 10A, so as to enclose the coupler 218 in the coupler compartment 250 and protect it from road contaminants, and may be opened, as shown in FIG. 10B, so as to provide access to the coupler 218. Additionally, the coupler compartment 250 may also be used for the storage of air tanks of a pneumatic braking system, for example, or any other articles such as tools.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A hopper trailer comprising:
a partial frame chassis mounted to a wheeled suspension, the partial frame chassis comprising two parallel longitudinal rails;
two triangular load transfer plates formed of hollow-core extruded aluminum panels, wherein each load transfer plate is mounted vertically on and carried by a different one of the longitudinal rails;
a container comprising opposing sidewalls, opposing end walls, and two sloping walls each spanning between and adjoining the opposing sidewalls, wherein the two sloping walls diverge upwardly and approach downwardly, the two sloping walls and the sidewalls forming a hopper having at a bottom of the hopper a discharge opening for emptying a bulk material carried in the hopper, and a gate for selectively retaining the bulk material in the hopper, wherein the sloping walls comprise a first sloping wall mounted on and carried by the load transfer plates, and the sidewalls are mounted to and carried by the first sloping wall; and
a coupler attached to a front end of the container for mounting to a trailer hitch.

2. A trailer comprising:
a chassis mounted to a wheeled suspension;
a load transfer plate mounted vertically on and carried by the chassis;
a container comprising opposing sidewalls and a sloping wall spanning between and adjoining the opposing sidewalls, wherein the sloping wall is mounted on and carried by the load transfer plate, and the sidewalls are mounted to and carried by the sloping wall; and
a coupler attached to a front end of the container for mounting to a trailer hitch.

3. The trailer according to claim 2, wherein the sloping wall is a first sloping wall, and the container comprises a second sloping wall adjacent to the first sloping wall, the second sloping wall spanning between and adjoining the opposing sidewalls, wherein:
the first sloping wall and second sloping wall approach upwardly and diverge downwardly;
the second sloping wall is mounted on and carried by the load transfer plate;
the sidewalls are further mounted to and carried by the second sloping wall; and
the load transfer plate has a triangular shape defined by an upper surface of the chassis and respective lower surfaces of the first sloping wall and the second sloping wall, wherein the load transfer plate is mounted at the upper surface of the chassis.

4. The trailer according to claim 2, wherein the container comprises a hopper formed by the sloping wall, the sidewalls, and another wall opposing the sloping wall, wherein a bottom of the hopper forms a discharge opening for emptying a bulk material carried in the hopper, and a gate for selectively retaining the bulk material in the hopper, wherein at least a part of a weight of the bulk material carried in the hopper is transferred vertically downwardly through the sloping wall to the load transfer plate and then vertically downwardly to the chassis.

5. The trailer according to claim 2, wherein the chassis comprises longitudinal rails and transverse cross-members.

6. The trailer according to claim 2, wherein the chassis is a partial frame chassis, wherein the wheeled suspension comprises a number of axles, wherein each axle rotatably supports a set of wheels, and wherein the partial frame chassis has a length approximately equal to a longitudinal span of the wheeled suspension.

7. The trailer according to claim 6, wherein the number of axles is one.

8. The trailer according to claim 6, wherein the number of axles is three.

9. The trailer according to claim 2, wherein the chassis has a length approximately equal to a length of a bottom edge of the load transfer plate.

10. The trailer according to claim 5, wherein the longitudinal rails of the chassis include a first longitudinal rail, and the load transfer plate is mounted vertically on the first longitudinal rail.

11. The trailer according to claim 10, wherein the first longitudinal rail is mounted to the wheeled suspension between opposite wheels of the wheeled suspension.

12. The trailer according to claim 11, wherein the load transfer plate is a first load transfer plate, the trailer further comprising a second load transfer plate mounted vertically on and carried by the chassis, wherein the sloping wall is further mounted on and carried by the second load transfer plate, wherein the longitudinal rails of the chassis include a second longitudinal rail, wherein the second load transfer plate is mounted vertically on the second longitudinal rail, and wherein the second longitudinal rail is mounted to the wheeled suspension between the opposite wheels of the wheeled suspension.

13. The trailer according to claim 3, wherein the container comprises a first hopper and a second hopper, the first hopper formed by the first sloping wall, the sidewalls, and a first opposing wall opposing the first sloping wall, the second hopper formed by the second sloping wall, the sidewalls, and a second opposing wall opposing the second sloping wall, wherein at least a part of a first weight of a first bulk material carried in the first hopper is transferred vertically downwardly through the first sloping wall to the load transfer plate and then vertically downwardly to the chassis, and at least a part of a second weight of a second bulk material carried in the second hopper is transferred vertically downwardly through the second sloping wall to the load transfer plate and then vertically downwardly to the chassis.

14. The trailer according to claim 13, wherein the first sloping wall and the second sloping wall meet and form a joint at respective upper edges, wherein the trailer further comprises a vertical separating wall further forming the joint at a lower edge thereof with the respective upper edges of the first sloping wall and the second sloping wall, the vertical separating wall extending upwardly toward an upper opening of the trailer, wherein the vertical separating wall separates the first hopper and the second hopper.

15. The trailer according to claim 14, wherein the vertical separating wall spans between and adjoins the opposing sidewalls, and the sidewalls are further mounted to and carried by the vertical separating wall.

16. The trailer according to claim 15, wherein the vertical separating wall comprises a vertical channel providing a vent for passage of air between an enclosed space beneath the vertical separating wall and a top opening of the trailer.

17. The trailer according to claim 16, wherein the vertical separating wall is formed of hollow-core extruded aluminum panels, and the vertical channel is provided by hollow channels in the hollow-core extruded aluminum panels.

18. The trailer according to claim 2 further comprising end walls, wherein the end walls adjoin and are carried by the sidewalls.

19. The trailer according to claim 3, wherein the container further comprises a floor forming with the first sloping wall, the second sloping wall, and the sidewalls an enclosed compartment beneath the first sloping wall and the second sloping wall, and wherein the floor or at least one of the sidewalls has an access door for providing access to the enclosed compartment.

20. The trailer according to claim 19, wherein the enclosed compartment is sized and configured for storing pneumatic air tanks.

21. The trailer according to claim 19, wherein the enclosed compartment is configured to prevent entry of road contaminants, thereby protecting the load transfer plate and contents of the compartment from the road contaminants.

22. The trailer according to claim 18 further comprising a coupler compartment at a front of the container for enclosing the coupler, the coupler compartment having a access hatch for accessing the coupler compartment, wherein the coupler compartment protects the coupler from road contaminants when the access hatch is closed.

23. The trailer according to claim 2, wherein the sidewalls and the load transfer plate are formed of hollow-core extruded aluminum panels.

24. The trailer according to claim 2, wherein the sloping wall is welded at opposing edges of the sloping wall to corresponding inner surfaces the opposing sidewalls, and the sloping wall is further welded at a bottom surface of the sloping wall to an upper edge of the load transfer plate.

\* \* \* \* \*